Jan. 10, 1961  E. A. HAWK, SR  2,967,645
SELF-LOADING GREASE GUN
Filed July 25, 1958  2 Sheets-Sheet 2
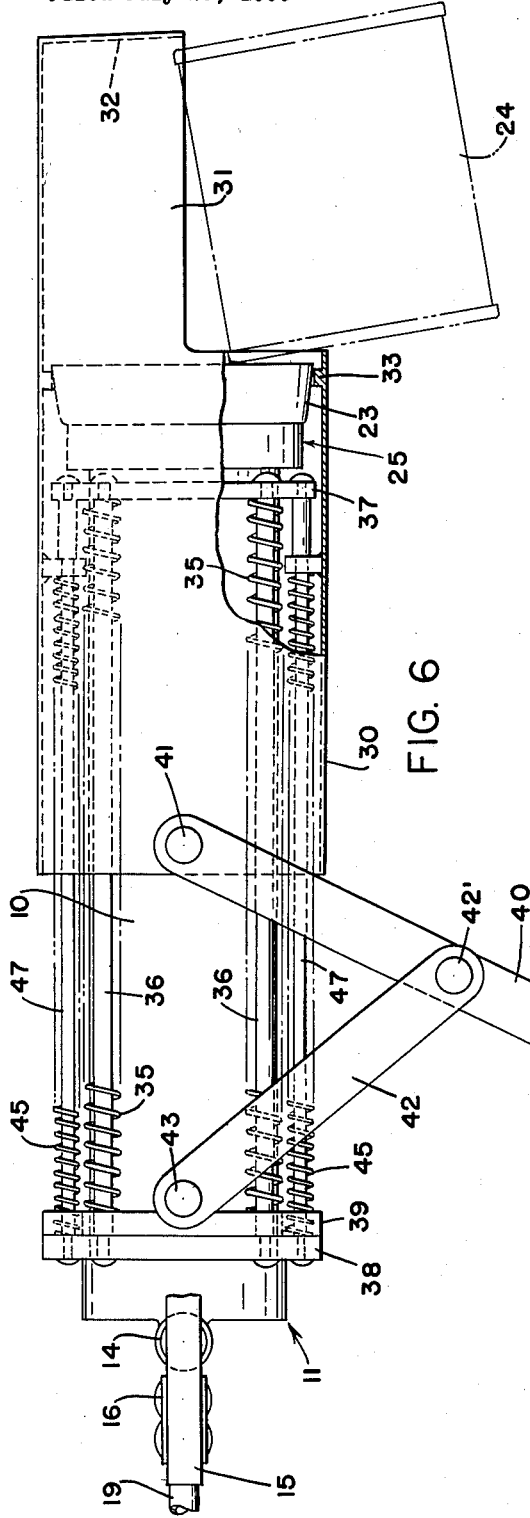
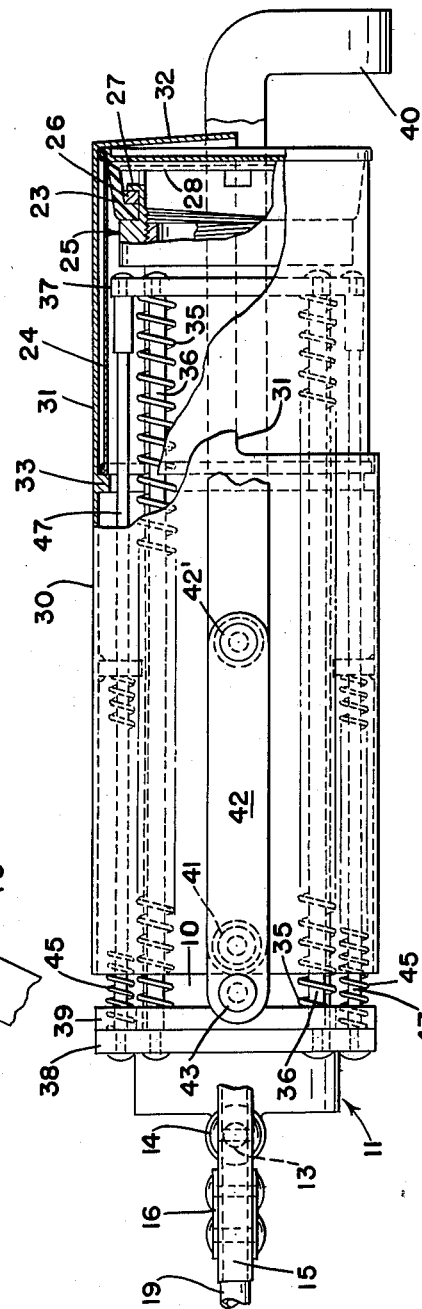
INVENTOR.
ELWIN A. HAWK, SR.
BY
ATTORNEYS United States Patent Office 2,967,645
Patented Jan. 10, 1961

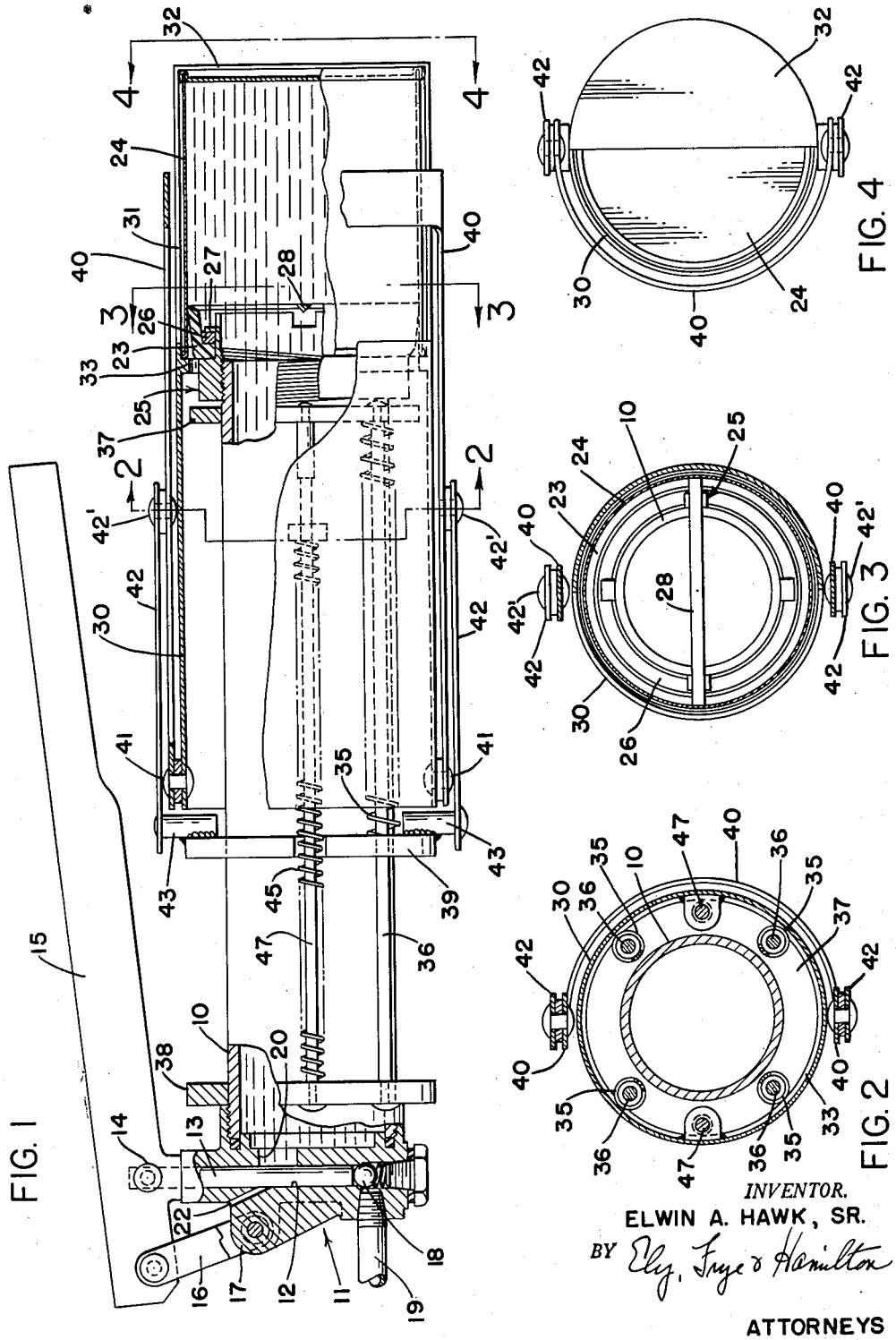

2,967,645

SELF-LOADING GREASE GUN

Elwin A. Hawk, Sr., East Rochester, Ohio, assignor of one-fourth to Elwin A. Hawk, Jr., one-fourth to Joseph L. Reto, and one-fourth to George A. Hawk, all of East Rochester, Ohio Filed July 25, 1958, Ser. No. 750,912

6 Claims. (Cl. 222—325)

The invention relates generally to devices for forcing lubricant into lubricant fittings on machinery, automotive mechanisms, and the like, and more particularly to an improved grease gun adapted to mount a can of lubricant on one end in such manner that the contents of the can are continuously forced into the gun as the gun dispenses lubricant from the other end.

The filling of greast guns is a messy and time-consuming operation. A conventional hand lever-operated gun, for example, has a head on which the lever is mounted and onto which the gun cylinder is screwed. A piston in the cylinder is urged toward the head by a spring abutting a removablee cap on the outer end of the cylinder through which the piston rod projects. To fill the gun, the cylinder is unscrewed from the head and with the piston compressing the spring, grease is inserted into the cylinder on the opposite end of the piston. This may be done by using a spatula or paddle which is a messy and time-consuming operation.

Another and faster way of inserting the grease is to hold the open end of the cylinder in a large can of grease and gradually compress the spring by pulling on the piston rod so as to suck the grease into the cylinder. Obviously, this method unavoidably smears the outside of the cylinder, and always requires a large mass of grease to completely fill the open end of the cylinder.

The device of the present invention enables mounting a small, standard size can of lubricant directly on the outer end of the gun cylinder in such manner that the lubricant in the can is gradually forced into one end of the cylinder as lubricant is dispensed from the other end of the cylinder by pumping the hand lever. When the can is emptied it can be quickly replaced by a full can.

Other objects of the invention include the provision of an improved self-loading grease gun which utilizes and completely removes all of the grease in a standard can of lubricant without the necessity of scraping or otherwise removing the grease by hand, which does not require a separate operation to fill or load the gun cylinder, and which wholly avoids smearing any grease on the exterior of the gun.

Further objects include the provision of an improved construction which is adapted to utilize the head and cylinder of a conventional grease gun, and which embodies an improved venting arrangement within the head to bleed air entrapped within the cylinder.

These and other objects are accomplished by the improvements comprising the present invention, a preferred embodiment of which is shown by way of example in the accompanying drawings, and described in detail in the following specification. Various modifications and changes in details of construction are comprehended within the scope of the invention as defined in the appended claims.

In the drawings:

Fig. 1 is a side elevation, with parts broken away and in section, of a hand lever-operated grease gun cylinder and head with the improved loading device mounted thereon in "cocked" position and holding a standard size can full of grease in loading position at the outer end of the gun cylinder.

Fig. 2 is a transverse section on line 2—2 of Fig. 1.

Fig. 3 is a transverse section on line 3—3 of Fig. 1.

Fig. 4 is a transverse section on line 4—4 of Fig. 1.

Fig. 5 is a side elevation at 90° to Fig. 1, showing the relative positions of the parts when the can has been emptied of grease.

Fig. 6 is a view similar to Fig. 5 with the loading device "uncocked" ready to receive a new can of grease.

The grease gun shown in the drawings has a cylinder 10 one end of which is screwed into a head 11 having a transverse bore 12 in which a plunger 13 is axially slidable. The plunger 13 projects from the head and is pivoted at 14 to a hand lever 15 one end of which is connected by a link 16 to a bracket ear 17 on the head.

A ball check valve 18 is positioned in the opposite end of the bore 12, and an outlet 19 is connected to the bore behind the ball. An inlet port 20 connects the bore intermediate its ends to the open end of the cylinder 10. Thus, as the plunger 13 is reciprocated by the hand lever 15, it forces or pumps lubricant from the cylinder 10 out of outlet 19 and the return of lubricant is prevented by the ball check valve 18.

It is necessary to provide a vent opening through the head to bleed entrapped air which would interfere with the discharge of lubricant through outlet 19. Certain prior constructions have included a vent through the head adjacent to the bore 12 and having a check valve therein which can be opened to vent air entrapped between the head and the cylinder. However, it frequently happens that air pockets occur within the inlet port 20 and these are not bled by opening the vent.

The vent opening 22 in the present construction is located at the intersection of the bore 12 and the inlet port 20 on the side adjacent to the hand lever, so that when the vent is opened air pockets within the inlet port will be vented, as well as within the end of cylinder 10. In order to open the vent, the operator pulls out the hand lever its full stroke to retract the plunger 13 sufficiently to uncover the vent opening 22 and bleed the entrapped air, and then resumes pumping grease by working the handle through the customary short strokes, during which the plunger keeps the vent opening closed.

Aside from the location of the vent opening, the construction of the head 11, hand lever and cylinder 10 may be conventional. Instead of closing the outer end of the cylinder and providing a piston therein, the present invention includes mounting an annular gasket or wiper ring 23 on the outer open end of the cylinder, and mounting a can of lubricant for slidably telescoping over the gasket and the adjacent portion of the cylinder.

The gasket 23 may be of any suitable material such as rubber, neoprene, felt or leather. Preferably, it has a flexible lip for wiping the inside of a standard size grease can 24 substantially larger in diameter than the cylinder 10. The inner peripheral portion of the gasket is secured in an annular groove in a mounting ring 25 which may be screwed onto the end of the cylinder 10. Preferably, the inner portion of the gasket 23 is clamped against an annular shoulder on the mounting ring 25 by a metal ring 26 seated in the groove and secured by tabs 27 bent out of the mounting ring over the clamping ring 26. As shown, the annular lip of the gasket 23 may have a diametric rib or cross bar 28 connecting its edges, for a purpose to be described.

The mechanism for holding the grease can 24 in telescopic relation to said gasket 23 preferably comprises a cylindrical sleeve 30 surrounding and radially spaced from the cylinder 10. The sleeve 30 has an outer end portion for holding the can 24, and this extension may be in the form of a half cylinder 31 with a closed outer end 32. The sleeve 30 has an inner annular shoulder 33 for abutting the inner end of the can, and the end 32 may be slightly inclined to facilitate entering the can.

In order to apply constant pressure to the outer end of the can to telescope it over the gasket 23 and force its contents into the gun cylinder 10, a compression spring arrangement is applied between the can holding mechanism and the mounting ring 25. This arrangement comprises a plurality of helical springs 35 (four being shown) extending longitudinally of the cylinder 10 and circumferentially spaced at intervals around the same, the springs being mounted on guide rods 36. The outer ends of the rods 36 are secured to a metal ring 37 abutting the mounting ring 25, and the inner ends of the rods are secured to a similar ring 38 abutting the head 11 of the gun.

A cocking or spring-compressing ring 39 normally abuts the ring 38, as shown in Figs. 5 and 6, and is slidable over the guide rods in abutment with the ends of the springs, as shown in Fig. 1. The mechanism for moving the ring 39 axially of cylinder 10 to compress the springs preferably comprises a linkage consisting of a yoke 40, preferably semi-cylindrical in shape, having two arms pivoted at 41 on the inner end of cylinder 30, and a pair of links 42 pivotally connecting opposite sides of the yoke to diametrically opposite pivots 43 on the cocking ring 39.

In operation, an open can 24 full of grease is inserted in the extension 31 of the holder with the linkage in the uncocked position of Fig. 6, and with the open end of the can telescoped over the wiper gasket 23, as shown in Fig. 1. The yoke is then swung toward the can to the position of Figs. 1 and 5 causing the links 42 to pull the ring 39 away from ring 38, compressing springs 35 against ring 37. When the pivots 42' of links 42 have been swung into alignment with pivots 41 and 43 the cocking mechanism is locked in place with the springs compressed between rings 39 and 37. As the grease in the cylinder is dispensed out of outlet 19 by reciprocating the plunger through short strokes, the springs gradually force the can over the gasket 23 toward the head to feed a continuous supply of grease through the gun cylinder. Obviously, when starting with an empty gun it may be necessary to insert and remove one or more cans before dispensing, depending upon the capacity of the gun.

When the cocking ring 39 has been returned to abutment with ring 38, showing that the can of grease is substantially empty and the gasket 23 has reached the bottom of the can, as in Fig. 5, any grease remaining on the bottom of the can may be removed by grasping the can and rotating it axially within the extension 31 of the holder. This action causes the cross bar 28 to scrape any remaining grease from the bottom of the can.

In order to insure that the sleeve 30 returns to can receiving position when the spring mechanism is uncocked, a pair of relatively weak helical springs 45 is interposed at diametrically opposite locations between the ring 38 and interior ears 46 on the sleeve 30. The springs 45 are mounted on guide rods 47 secured at their ends in rings 37 and 38 and passing slidably through holes in the ears 46. The springs and rods pass through holes in ring 39. Thus, in the position shown in Fig. 5 the springs 45 are compressed and when the yoke 40 is swung to uncocked position, the springs 45 move the sleeve outward to the can receiving position of Fig. 6, overcoming any binding action on the sleeve.

The improved self-loading gun requires only the insertion of a full can of grease and the removal of any empty can, both of which operations are accomplished quickly and easily without any necessity of handling the grease apart from the can, and without smearing any of the grease on the outside of the gun or the can. The mechanism for holding the can and charging its grease into the gun can be easily adapted to any standard grease gun by removing the inner piston assembly and end cap of the gun. The can holder and its annular gasket can be varied in size to fit larger sizes of cans while maintaining the other dimensions of the mechanism. Further, if desired, the gun head can be replaced with an end plate having a hose connection supplying lubricant to a remote grease gun head equipped with a hand lever and plunger to dispense grease from a discharge fitting.

What is claimed is:

1. In combination with a grease gun having a dispensing head and a grease supply cylinder connected at one end thereto, an annular gasket mounted on the outer end of said cylinder, a sleeve slidable over the cylinder, means on said sleeve for holding a grease can telescoped over said gasket, spring means adapted when compressed for urging said sleeve toward said head, linkage means on said sleeve for compressing said spring means, and a second spring means for urging said sleeve away from said head when the first spring means is uncompressed.

2. In combination with a grease gun having a dispensing head and a grease supply cylinder connected at one end thereto, an annular gasket mounted on the outer end of said cylinder, can holding means axially slidable over the cylinder having a compressing ring at its inner end and radially extending means at its outer end for engaging the bottom of a can telescoped over said gasket, springs interposed between said ring and the outer end of said cylinder, linkage means for moving said ring toward the outer end of said cylinder to compress said springs, and springs interposed between said can holding means and the inner end of said cylinder for urging said can holding means toward the outer end of said cylinder when the first said springs are uncompressed.

3. In a grease gun having a dispensing head and a grease supply cylinder connected at its inner end to said head, means for continuously loading grease into the outer end of said cylinder comprising an annular gasket mounted around said outer end of said cylinder, an annular holder movable axially over said cylinder, an extension on said holder for engaging behind and holding a grease can telescoped over said gasket, a ring surrounding said cylinder at the inner end of said annular holder, spring means between said ring and the outer end of said cylinder, and linkage means connecting said ring and said holder for moving the ring toward the holder and compressing said spring means to urge the rear end of said grease can toward said gasket.

4. In a grease gun having a dispensing head and a grease supply cylinder connected at its inner end to said head, means for continuously loading grease into the outer end of said cylinder comprising an annular gasket mounted around said outer end of said cylinder, an annular holder movable axially over said cylinder, an extension on said holder for engaging behind and holding a grease can telescoped over said gasket, a ring surrounding said cylinder at the inner end of said annular holder, spring means between said ring and the outer end of said cylinder, linkage means connecting said ring and said holder for compressing said spring means, and a second spring means interposed between said holder and the inner end of said cylinder for urging said holder toward the outer end of said cylinder when said first spring means is uncompressed.

5. In a grease gun having a dispensing head and a grease supply cylinder connected at its inner end to said head, means for continuously loading grease into the outer end of said cylinder comprising an annular gasket mounted around said outer end of said cylinder, spring guide rods extending exteriorly of said cylinder between its ends, an annular holder movable longitudinally over said guide rods, an extension on the outer end of said holder for engaging behind and supporting a grease can telescoped over said gasket, a ring surrounding the inner end portion of said cylinder and slidable over said guide rods, springs on the guide rods interposed between said ring and the outer end of said cylinder, a linkage connecting said ring and said holder, and a lever for actuating said linkage to compress the springs and urge the holder toward the inner end of said cylinder.

6. In a grease gun having a dispensing head and a grease supply cylinder connected at its inner end to said head, means for continuously loading grease into the outer end of said cylinder comprising an annular gasket mounted around said outer end of said cylinder, spring guide rods extending exteriorly of said cylinder between its ends, an annular holder movable longitudinally over said guide rods, an extension on the outer end of said holder for engaging behind and supporting a grease can telescoped over said gasket, a ring surrounding the inner end portion of said cylinder and slidable over said guide rods, springs on the guide rods interposed between said ring and the outer end of said cylinder, a linkage connecting said ring and said holder, a lever for actuating said linkage to compress the springs and urge the holder toward the inner end of said cylinder, and spring means interposed between said holder and the inner end of said cylinder for urging said holder toward the outer end of the cylinder when said first springs are uncompressed.

References Cited in the file of this patent

UNITED STATES PATENTS

| | | |
|---|---|---|
| 2,105,991 | Schultz | Jan. 18, 1938 |
| 2,174,421 | Krannak | Sept. 26, 1939 |
| 2,433,506 | Davis | Dec. 30, 1947 |
| 2,634,888 | Sherbondy | Apr. 14, 1953 |
| 2,758,758 | Schimpf | Aug. 14, 1956 |